United States Patent
Yin et al.

(10) Patent No.: US 11,159,429 B2
(45) Date of Patent: Oct. 26, 2021

(54) REAL-TIME CLOUD CONTAINER COMMUNICATIONS ROUTING

(71) Applicant: International Business Machines Corporation, Armonk, NY (US)

(72) Inventors: Jian Dong Yin, Beijing (CN); Wen Wang, Beijing (CN); Zhuo Cai, Beijing (CN); Rong Fu, Ningbo (CN); Hao Sheng, Ningbo (CN); Kang Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 16/364,484

(22) Filed: Mar. 26, 2019

(65) Prior Publication Data

US 2020/0314013 A1 Oct. 1, 2020

(51) Int. Cl.
| | |
|---|---|
| *H04L 12/803* | (2013.01) |
| *H04L 12/707* | (2013.01) |
| *H04L 12/911* | (2013.01) |
| *H04L 12/26* | (2006.01) |
| *H04L 12/917* | (2013.01) |
| *H04L 12/801* | (2013.01) |

(52) U.S. Cl.
CPC ........ *H04L 47/122* (2013.01); *H04L 43/0882* (2013.01); *H04L 45/22* (2013.01); *H04L 47/29* (2013.01); *H04L 47/748* (2013.01); *H04L 47/76* (2013.01)

(58) Field of Classification Search
CPC ....... H04L 47/00; H04L 47/10; H04L 47/122; H04L 47/125; H04L 47/15; H04L 47/29; H04L 47/76; H04L 47/748; H04L 43/00; H04L 43/04; H04L 43/062; H04L 43/08; H04L 43/16; H04L 45/22; H04L 67/1002; H04L 67/1004; H04L 67/1008; H04L 67/1021; H04W 24/00; H04W 24/02; H04W 24/04; H04W 24/08
See application file for complete search history.

(56) References Cited

U.S. PATENT DOCUMENTS

| | | | | |
|---|---|---|---|---|
| 6,081,900 A | * | 6/2000 | Subramaniam | ...... G06Q 20/382 707/999.01 |
| 7,552,189 B2 | * | 6/2009 | Mehra | ...................... G06F 9/547 709/215 |

(Continued)

OTHER PUBLICATIONS

"Alibaba Cloud CDN", Product Introduction, printed Dec. 19, 2018, 11 pages. https://www.google.co.in/url?sa=t&rct=j&q=&esrc=s&source=web&cd=8&cad=rja&uact=8&ved=2ahUKEwjK9LO2j7_eAhXEvl8KHfe-CK8QFjAHegQIABAC&url=http%3A%2F%2Fdocs-aliyun.cn-hangzhou.oss.aliyun-inc.com%2Fpdf%2Fcdn-brief-manual-intl-en-2017-03-31.pdf&usg=AOvVaw3HbW91JpDyZYaMOK_uoH11.

*Primary Examiner* — Kan Yuen
(74) *Attorney, Agent, or Firm* — Timothy J. Singleton

(57) ABSTRACT

A method for real-time cloud container communications routing is provided. The method monitors network traffic to a first network resource located within a first region. Based on monitoring the network traffic, the method determines a second region associated with at least a portion of the network traffic. The method generates a resource backup of the first network reference. The resource backup represents a current state of the first network resource. The method transfers the resource backup to a second network resource associated with the second region and redirects at least a portion of the network traffic to the second network resource.

20 Claims, 7 Drawing Sheets

(56) References Cited

U.S. PATENT DOCUMENTS

| | | | |
|---|---|---|---|
| 9,032,070 B1 * | 5/2015 | Stickle | H04L 43/12 709/224 |
| 9,374,276 B2 | 6/2016 | Batrouni et al. | |
| 2010/0228819 A1 * | 9/2010 | Wei | G06F 9/505 709/203 |
| 2011/0153719 A1 * | 6/2011 | Santoro | H04L 67/1008 709/203 |
| 2013/0262697 A1 * | 10/2013 | Karasaridis | H04L 67/2847 709/242 |
| 2015/0319093 A1 * | 11/2015 | Stolfus | G08G 1/0133 370/237 |
| 2017/0244593 A1 * | 8/2017 | Rangasamy | H04L 67/1097 |
| 2018/0278639 A1 | 9/2018 | Bernstein et al. | |

* cited by examiner

REAL-TIME CLOUD CONTAINER COMMUNICATIONS ROUTING

BACKGROUND

Computer systems and communications networks enable data hosting, storing, processing, and distribution services across varied network resources. Cloud computing may be understood as providing such services via a communications infrastructure, such as the internet, instead of a local server or personal computer. Currently, cloud computing systems often user containers, a logical packaging system capable of abstracting applications from a runtime environment. Containers allow developers to package an application, along with libraries and dependencies. This packaging enables developers isolated environments for running software services. While container systems and methods are common, cloud platforms often regionalize resources. Regionalizing resources often associates physical servers and resources with geographical regions and content creators and distributors located within those regions. Such regionalization often prohibits emergency scenario handling, limiting abilities of some cloud computing services and systems from effectively reacting to network connectivity and traffic management issues.

Some current systems use content delivery networks (CDN). A CDN is a distributed network of resources, including servers, proxy servers, and data centers. The resources of a CDN may be geographically distributed to provide availability of services to end users at varied locations. CDNs may act as a layer in the ecosystem of the Internet. CDNs are operated to deliver content of distributors to end users. When setting up a relationship or content with a CDN, content distributors are often compelled to select a geographical region. Although CDNs have geographically distributed resources, limiting content creators and distributors to a region often subjects those creators and distributors to localized or regionalized connectivity, slowed data transmission, and other regional phenomenon affecting local or regional resources.

SUMMARY

According to an embodiment described herein, a computer-implemented method for real-time dynamic optimization of communication routing for cloud containers based on network traffic is provided. The communication routing may be managed by monitoring network traffic to a first network resource located within a first region. The method determines a second region associated with at least a portion of the network traffic. Determination of the second region may be based on monitoring of the network traffic. The method generates a resource backup of the first network resource. The resource backup represents a current state of the first network resource. The resource backup may be generated in real-time. The method transfers the resource backup to a second network resource associated with the second region. The method then redirects at least a portion of the network traffic to the second network resource.

In some embodiments, transferring the resource backup to the second network resource further comprises identifying one or more network resources associated with the second region. The method determines an operating capacity of the one or more network resources. Based on the operating capacities, the method selects the second network resource from the one or more network resources and copies the resource backup to the second network resource.

In some embodiments, the method redirects a portion of network traffic. In some instances, redirection of the network traffic comprises transmitting a redirect message from one or more of the first network resource and the second network resource to one or more client devices associated with the network traffic.

In some embodiments, the method determines that the network traffic to the first network resource exceeds a traffic threshold. The determination may be part of monitoring the network traffic to the first network resource.

In some embodiments, the method monitors network traffic at the first network resource based on redirecting a portion of network traffic to a second network resource. The method determines that the network traffic to the first network resource is below a traffic threshold. The method then redirects network traffic from the second network resource to the first network resource. In some instances, the method then releases the second network resource from the resource backup.

Some embodiments of the inventive concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating or transporting the program for use, by, or in connection, with the instruction execution system, apparatus, or device.

DETAILED DESCRIPTION

Figure 1:
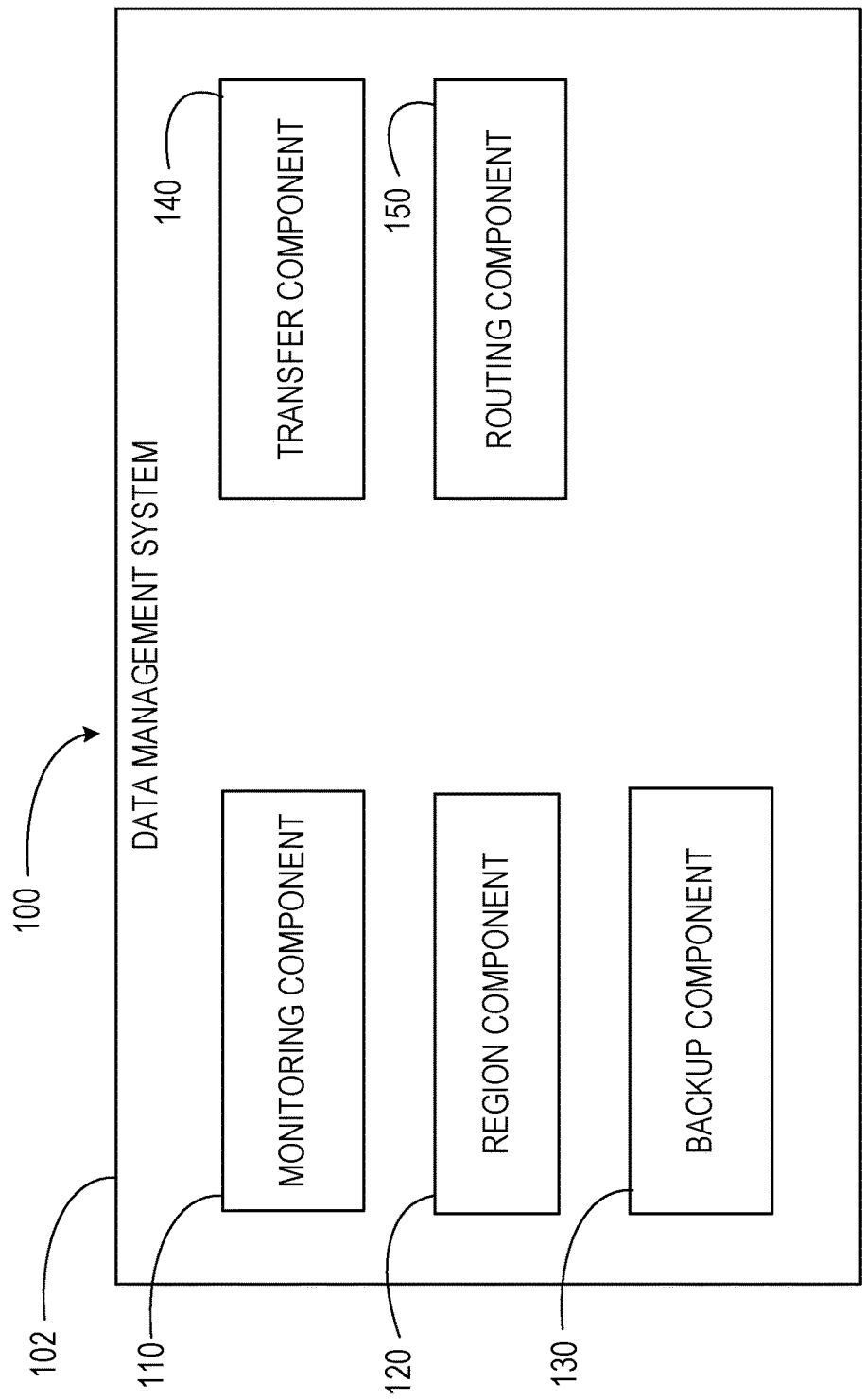
FIG. 1 depicts a block diagram of a computing environment for implementing concepts and computer-based methods, according to at least one embodiment.

The present disclosure relates generally to a method for managing cloud computing resources, but not exclusively, to a computer-implemented method for real-time cloud container communications routing. The present disclosure relates further to a related system for real-time cloud container communications routing, and a computer program product.

Cloud computing containers and CDNs are widespread technologies used to distribute or otherwise provide access to content over communications infrastructure. Containers are often used to deploy applications and functionality. Most cloud platforms provide container services to satisfy customer requests and network traffic resulting from services contracted by the customers.

Customers of these distribution services are often instructed to select a geographic region when signing up for cloud computing services. Applications and data may then be deployed for the customer on physical servers in the region selected by the customer or the region most relevant to the customer. Cloud computing companies impose this region selection as a way to reduce in/out communication costs. However, imposition of specified regions and related servers often fail to handle traffic errors, such as communication failures, communication traffic overloads, periodic traffic overloads, event-based traffic issues, and other similar emergencies. For example, where an unexpected viral event occurs (e.g., sudden traffic relating to a viral video), flooding a network resource with unexpected traffic, region imposed cloud computing models often fail to adequately respond and manage traffic. CDNs are often used in attempt to circumvent traffic events of cloud computing systems described above. CDNs may make backup resources available on certain server nodes in advance of traffic events. As such, CDNs may partially mitigate traffic events. However, the CDN must generate the backup in advance. Thus, if servers of a region are out of the backup's scope, the CDN does not effectively resolve the traffic event. Server nodes of the CDN associated with the backup may be subject to the same traffic event or be otherwise compromised, reducing the CDNs effectiveness at resolving traffic events.

Embodiments of the present disclosure provide a technical solution for traffic management for cloud computing resources. As will be discussed in more detail below, embodiments of the present disclosure present methods and systems for real-time cloud container communications routing. The present disclosure also describes dynamic optimization of communication routes for cloud containers based on real-time in/out traffic.

In some embodiments, systems and methods of the present disclosure describe monitoring network traffic to a first network resource located in a first geographic region. Based on the monitoring, the methods and systems determine a second region associated with at least a portion of the network traffic. The method and systems generate a resource backup of the first network resource. The resource backup may represent a current state of the first network resource. The methods and systems transfer the resource backup to a second network resource associated with the second geographic region. At least a portion of the network traffic may then be redirected to the second network resource.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise a data management system 102. The data management system 102 may comprise a monitoring component 110, a region component 120, a backup component 130, a transfer component 140, and a routing component 150. The monitoring component 110 may monitor network traffic to network resources within a cloud computing system. The region component 120 determines regions associated with traffic and network resources. The backup component 130 may generate resource backups for designated network resources. The backup component 130 may generate the resource backups in real-time, responsive to input from one or more of the components of the data management system 102. The transfer component 140 may transfer the resource backup to alternative network resources based on input from one or more of the components of the data management system 102. The routing component 150 may redirect at least a portion of the network traffic received at a first network resource to a second network resource. Although described with distinct components, it should be understood that, in at least some embodiments, components may be combined or divided, or additional components may be added, without departing from the scope of the present disclosure.

Figure 2:
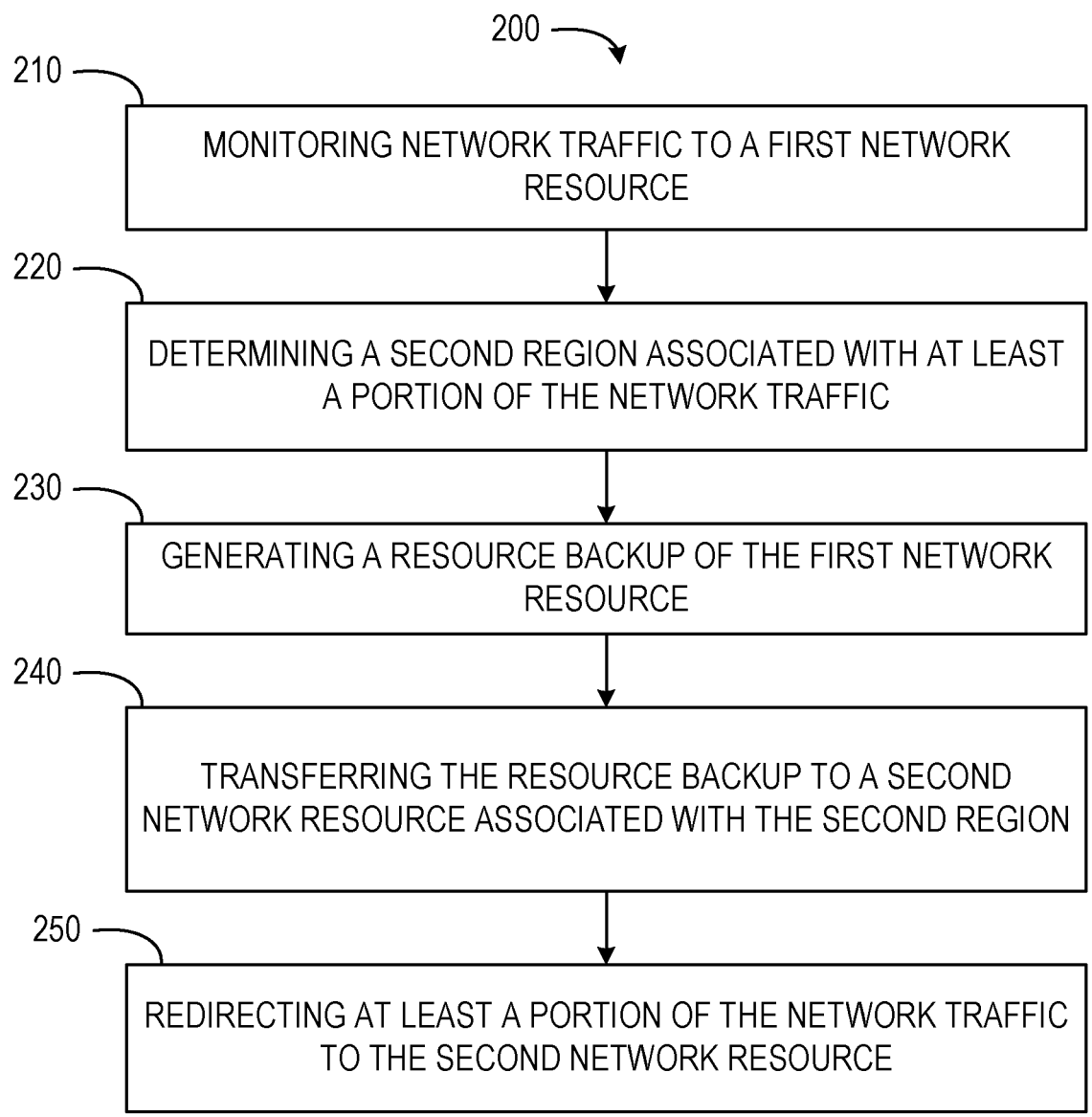
FIG. 2 depicts a flow diagram of a computer-implemented method for real-time cloud container communications routing, according to at least one embodiment.

Referring now to FIG. 2, a flow diagram of a computer-implemented method 200 is shown. The computer-implemented method 200 is a method for real-time cloud container communications routing. In some embodiments, the computer-implemented method 200 may be performed by one or more components of the computing environment 100, as described in more detail below.

At operation 210, the monitoring component 110 monitors network traffic to a first network resource located within a first region. In some embodiments, the monitoring component 110 monitors the network traffic in real-time, as the traffic is passing to and from the first network resource. The monitoring component 110 may monitor the network traffic to the first network using logs, network traffic monitoring tools, packets received at the network resource, packets acknowledged or responded to by the network resource, or any other suitable tools or methods. Although described using specified data or metrics, it should be understood that the monitoring component 110 may monitor the network traffic using any suitable traffic metric.

The monitoring component 110 may monitor volume and frequency of traffic to network resources. The monitoring component 110 may also monitor geographic information for the traffic to the network resources. In some embodiments, the monitoring component 110 identifies regions from which traffic is received from end users or clients of the network resources. The monitoring component 110 may also identify proportions, percentages, or other comparative metrics indicating relative amounts of traffic received from identified regions or geographical locations. For example, the monitoring component 110 may determine that seventy percent of network traffic is being received at a specified network resource from routers in a region including the United States, while the specified network resource is located in a region including portions of Asia.

In some embodiments, at least a portion of the monitoring component 110 is implemented at each network resource, such that monitoring components at each network resource transmit monitoring information, data, or metrics to a centralized data management system 102. In some instances, each network resource includes an implementation of the data management system 102, such that each network resource may monitor traffic incoming to that network resource, independent of other network resources within a cloud computing system.

At operation 220, the region component 120 determines a second region associated with at least a portion of the network traffic. The determination of the second region may be based on the monitoring component 110 monitoring the network traffic. In some embodiments, the region component 120 determines the second region from metrics included in the monitored network traffic. The region component 120 may identify the second region as a second region distinct from the first region of the first network resources. As noted in the example above, the region component 120 may determine that the first region is an Asian region and the second region is a region including the United States.

In some instances, the region component 120 determines the second region as a region associated with a greatest portion of the network traffic. As in the above-described example, the region component 120 may determine the second region is the region including the United States based on the percentage of traffic emanating from the United States being higher than traffic coming from one or more other regions. In some embodiments, the region component 120 determines the second region as a region associated with traffic having latency or other metric greater than a specified threshold. For example, the second region may be determined to be a region having a greatest negative effect (e.g., compared to a specified threshold) on network traffic received by the first network resource.

At operation 230, the backup component 130 generates a resource backup of the first network resource. The resource backup may represent a current state of the first network resource. The resource backup may include or comprise a container implemented at the first network resource. In some embodiments, the resource backup is generated in real-time. In some embodiments, the backup component 130 generates a resource backup including content being distributed from the first network resource at a time proximate to the network traffic exceeding a traffic threshold. The backup component 130 may generate the resource backup to include all the content of the first network resource or a portion of the content of the first network resource. In some instances, the backup component 130 generates a resource backup for content associated with traffic from the second region. For example, where the traffic coming from the second region is requesting provision of a specified set of content (e.g., a certain set of video content), the backup component 130 may selectively generate the resource backup to include the specified set of content, without backing up the remaining content on the first network resource. The backup component 130 may generate the resource backup using any suitable method or set of operations suitable to backup a current state of the first network resource or current state of content within the first network resource.

At operation 240, the transfer component 140 transfers the resource backup to a second network resource, which is associated with the second region. In some embodiments, the transfer component 140 receives a representation (e.g., an identification, name, or network address) of the second region from the region component 120. The transfer component 140 may also receive a representation of the second network resource within the second region. As discussed above, the second region may be the region associated with a bulk of the network traffic being received by the first network resource. The transfer component 140 may then receive the resource backup from the backup component 130. Based on the representation of the second region and/or the second network resource, the transfer component 140 transmits, or otherwise causes, the resource backup to be stored or implemented on the second network resource. In embodiments where the transfer component 140 receives the representation of the second region associated with the network traffic, the transfer component 140 may select a network resource of the second region as the second network resource, as will be explained in more detail below.

At operation 250, the routing component 150 redirects at least a portion of the network traffic to the second network resource. In some embodiments, the routing component 150 redirects the portion of the network traffic requesting provision of data within the resource backup to the second network resource. For example, where the backup resource represents a container including only a portion of data from the first network resource, the portion of network traffic redirected to the second network resource may be network traffic requesting provision of data within the backup resource container. In some embodiments, the routing component 150 redirects all of the network traffic from the first network resource to the second network resource. For example, where the backup resource includes all of the data from the first network resource, the routing component 150 may redirect all of the network traffic from the first network resource to the second network resource.

The routing component 150 may redirect the portion of network traffic as the network traffic is being received at the first network resource. In some embodiments, the routing component 150 transmits a redirect notice, packet, or message to client devices or IP addresses associated with the portion of network traffic requesting provision of data within the backup resource. The routing component 150 may transmit the redirect notice, packet, or message as a response to a request for provisioning. In some instances, once a client device receives the redirect message, subsequent requests for provisioning data within the backup resource may be addressed or otherwise directed to the second network resource, without initially being directed to the first network resource. In some instances, redirecting the portion of the network traffic is maintained during a current session of the network traffic. Redirecting the portion of the network traffic may also be maintained until a specified network traffic metric or threshold is achieved at the first network resource (e.g., network lag falls below a specified latency threshold). In some instances, redirecting the portion of the network traffic may be maintained until the backup resource is removed from the second network resource.

In some embodiments, redirecting the portion of the network traffic includes transmitting a redirect message. The routing component 150 may transmit the redirect message from one or more of the first network resource and the second network resource to one or more client devices associated with the network traffic. The routing component 150 may also transmit the redirect message from a system or network resource distinct from the first network resource and the second network resource.

Figure 3:
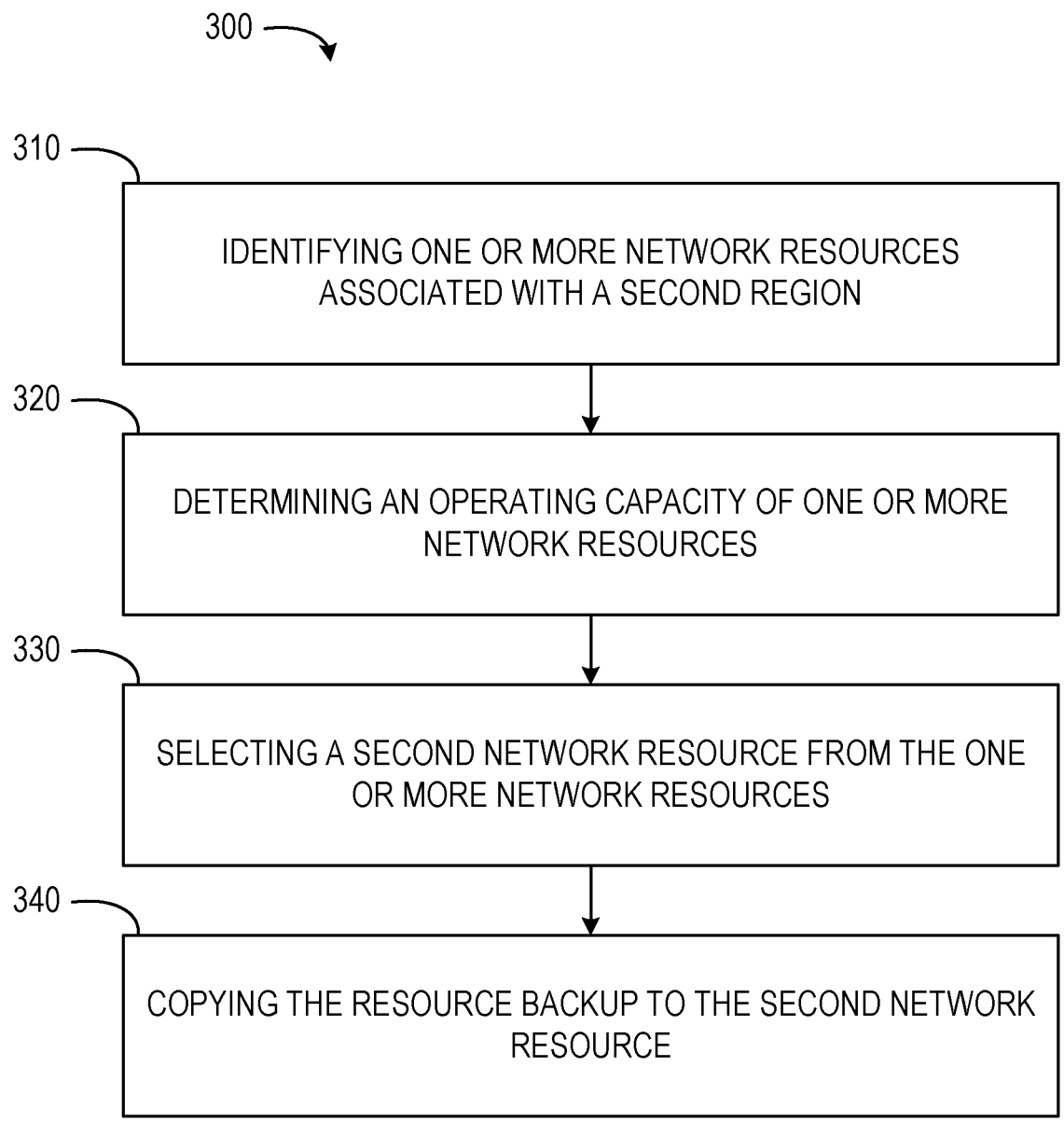
FIG. 3 depicts a flow diagram of a computer-implemented method for real-time cloud container communications routing, according to at least one embodiment

FIG. 3 shows a flow diagram of an embodiment of a computer-implemented method 300 for real-time cloud container communications routing. The method 300 may be performed by or within the computing environment 100. In some embodiments, the method 300 comprises or incorporates one or more operations of the method 200. In some instances, operations of the method 300 may be incorporated as part of or sub-operations of the method 200. For example, the operations of the method 300 may comprise all, part, or sub-operations of operation 240 of the method 200.

In operation 310, one or more of the region component 120 and the transfer component 140 identifies one or more network resources associated with the second region. In some embodiments, after identifying the second region associated with the network traffic, the region component 120 identifies network resources, available to the data management system 102, which are associated with the second region. The region component 120 may identify the one or more network resources by comparing an identification or representation of the second region with a resource list associating one or more regions with one or more network resources. In some instances, the region component 120 passes information identifying the second region to the transfer component 140. The transfer component may then identify network resources which are physically located within the second region.

In operation 320, the monitoring component 110 determines an operating capacity of the one or more network resources. The monitoring component 110 may determine the operating capacity of the one or more network resources by determining network traffic levels currently experienced at each network resource of the one or more network resources. The monitoring component 110 may determine network traffic capacities of each network resource of the one or more network resources. The monitoring component 110 may then determine the operating capacity by determining a difference between the traffic levels currently experienced by the network resources and the network traffic levels of which the network resources are capable of handling. In some embodiments, where a plurality of network resources is being considered, the monitoring component 110 may pare at least one network resource from the plurality of network resources based on the operating capacity of the pared network resource being below the network traffic level experienced by the first network resource.

In operation 330, the transfer component 140 selects the second network resource from the one or more network resources. The transfer component 140 may select the second network resource as a network resource having an operating capacity capable of accepting the level of network traffic experienced by the first network resource, or a level of traffic associated with the resource backup. In some instances, the transfer component 140 selects the second network resource as a network resource having an operating capacity capable of accepting more traffic than the level of network traffic associated with the resource backup. Although described with specific examples, it should be understood that the transfer component 140 may select the second network resource from the one or more network resources based on any suitable network traffic metric or any other suitable metric.

In operation 340, transfer component 140 copies the resource backup to the second network resource. In some embodiments, the transfer component 140 copies the resource backup by sending the resource backup via a communications network to the second network resource. The transfer component 140 may copy or otherwise transfer the resource backup to the second network resource in a manner similar to or the same as described above with respect to operation 240.

Figure 4:
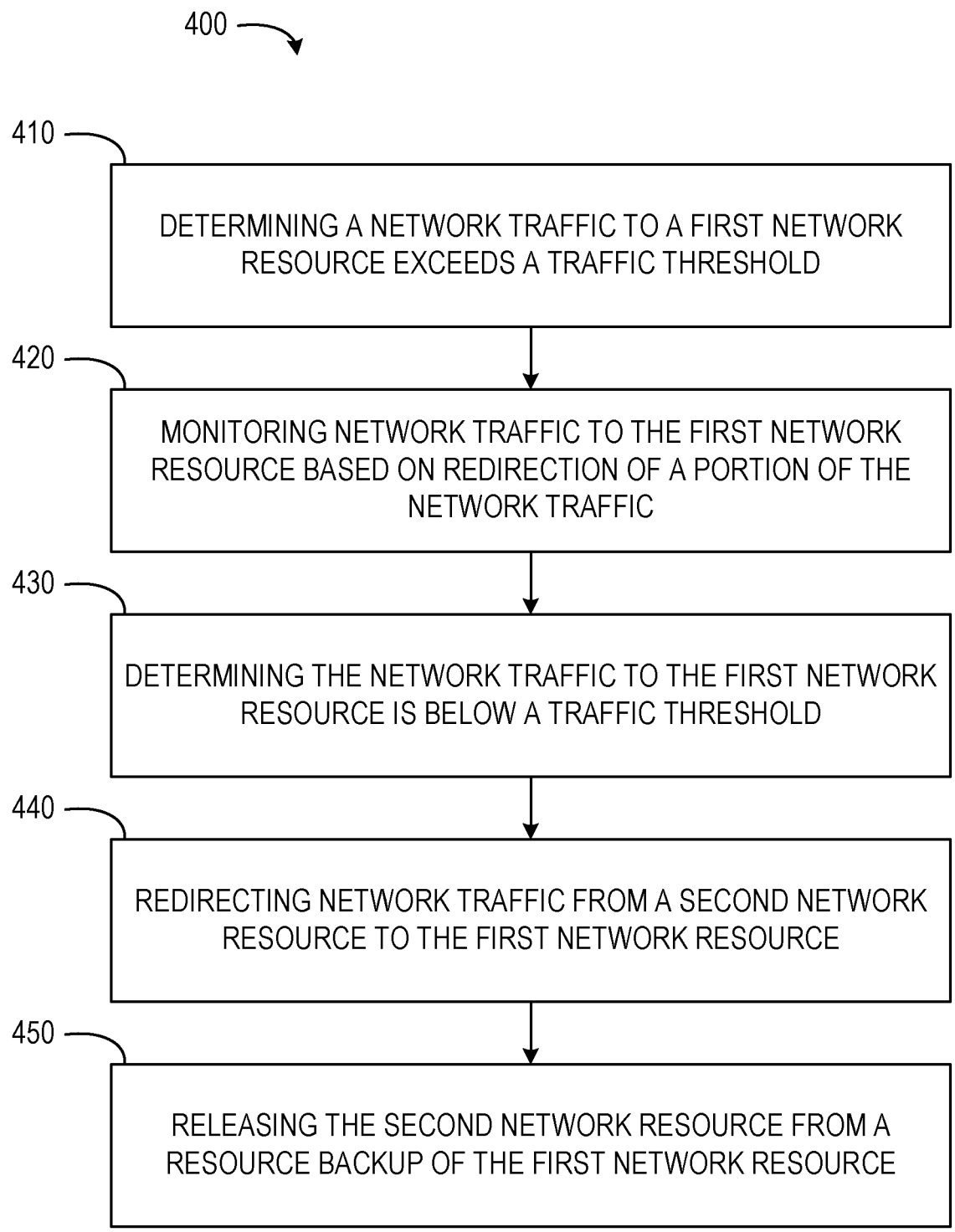
FIG. 4 depicts a flow diagram of a computer-implemented method for real-time cloud container communications routing, according to at least one embodiment.

FIG. 4 shows a flow diagram of an embodiment of a computer-implemented method 400 for real-time cloud container communications routing. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300.

In operation 410, the monitoring component 110 determines the network traffic to the first network resource exceeds a traffic threshold. In some embodiments, determining the network traffic exceeds the traffic threshold may be part of operation 210. Once the monitoring component 110 determines a level, frequency, density or other metric for the network traffic, the monitoring component 110 may compare the metric for the network traffic to the traffic threshold. The traffic threshold may be a maximum value for a network traffic metric, such that meeting or exceeding the traffic threshold indicates the first network resource is receiving a level of network traffic that is too high for the first network resource or too high for the container.

In operation 420, the monitoring component 110 monitors network traffic to the first network resource based on redirection of the portion of the network traffic to the second network resource. For example, operation 420 may be performed based on or in response to redirection of the network traffic in operation 250 of the method 200. In some embodiments, the monitoring component 110 may continually monitor network traffic for the first network resource. In such instances, the monitoring component 110 may log the backup and transfer of the resource backup. The monitoring component 110 may initiate monitoring of the network traffic after detecting a traffic jam or slowdown in the responses of the first network resource. The monitoring component 110 may monitor the network traffic as described above with respect to methods 200 and 300.

In operation 430, the monitoring component 110 determines the network traffic to the first network resource is below a traffic threshold. After initiating monitoring, the monitoring component 110 may continue monitoring the first network resource until the traffic at the first network resource falls below the traffic threshold or otherwise falls back within normal operating parameters. In some embodiments, the monitoring component 110 may determine the network traffic is below the traffic threshold after the network traffic has maintained a suitable level for a predetermined period of time. For example, the monitoring component 110 may determine the network traffic is below the threshold only after the network traffic has stabilized below the traffic threshold for an hour or longer. In some instances, the monitoring component 110 may determine a length of time dynamically, based on one or more characteristics of the network traffic, the content within the container, the first network resource (e.g., historical traffic levels given a time of day, date, week, year, etc.).

In operation 440, the routing component 150 redirects network traffic from the second network resource to the first network resource. In some embodiments, the routing component 150 redirects the network traffic in a manner similar to or the same as described above with respect to operation 250. The routing component 150 may redirect the network traffic by removing a block or redirection notice from the first network resource. The routing component 150 may redirect the network traffic by contacting one or more client devices associated with the traffic with a redirection notice. The redirection notice may indicate cessation of traffic for the resource backup at the second network resource and provide a network address for the first network resource for subsequent network traffic related to the container.

In operation 450, the transfer component 140 releases the second network resource from the resource backup. In some embodiments, the transfer component 140 releases the second network resource by deleting the resource backup from the second network resource. The transfer component 140 may also mark the resource backup for deletion on the second network resource. The transfer component 140 may also release the second network resource by transferring to or applying another resource backup or container in place of the resource backup being removed from the second network resource. Although described with specified examples, the transfer component 140 may release the second network resource, and thereby free memory of the second network resource in any suitable manner.

Figure 5:
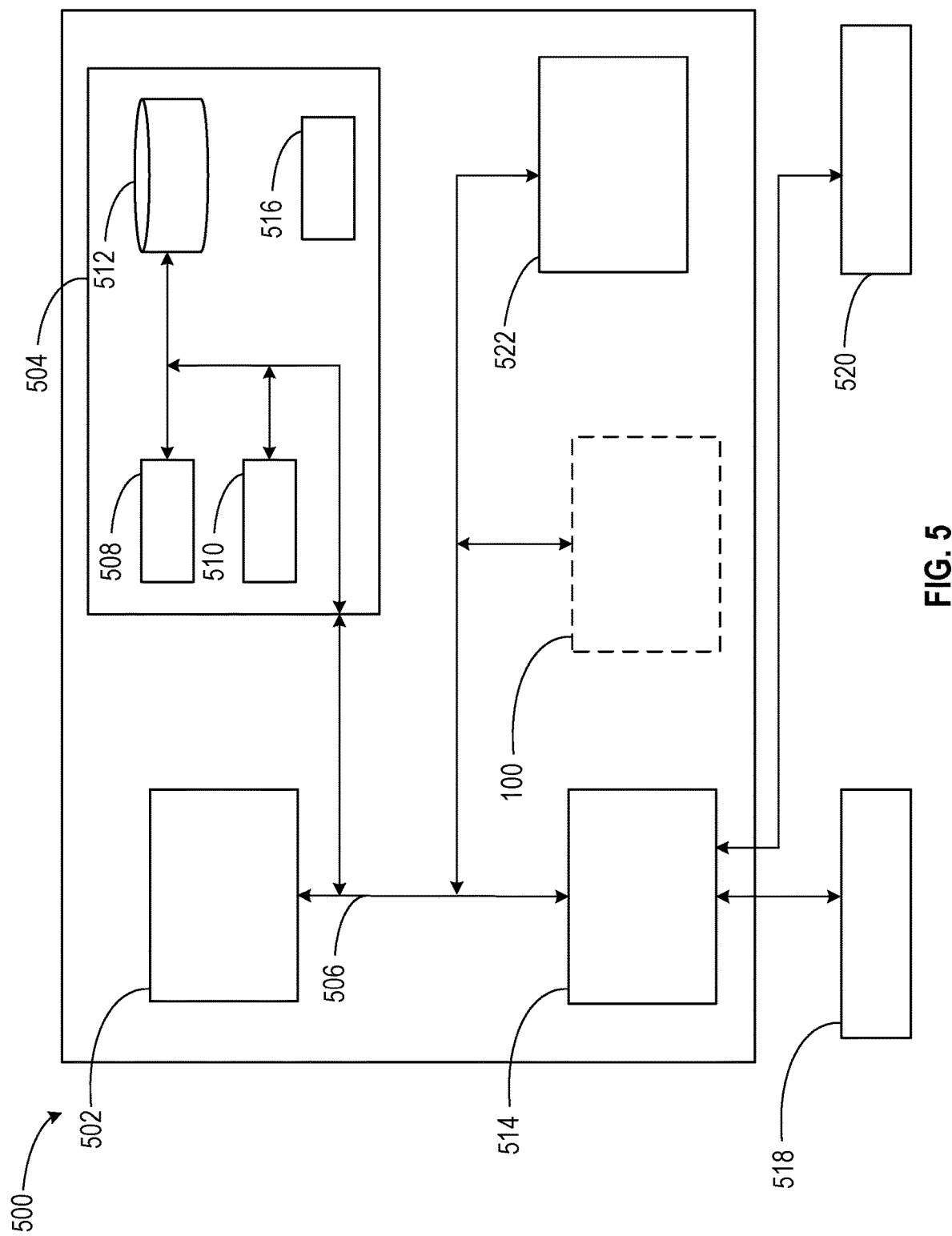
FIG. 5 depicts a block diagram of a computing system for real-time cloud container communications routing, according to at least one embodiment.

Embodiments of the present disclosure may be implemented together with virtually any type of computer, regardless of the platform being suitable for storing and/or executing program code. FIG. 5 shows, as an example, a computing system 500 suitable for executing program code related to the methods disclosed herein.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the monitoring component 110, the region component 120, the backup component 130, the transfer component 140, and the routing component 150, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Figure 6:
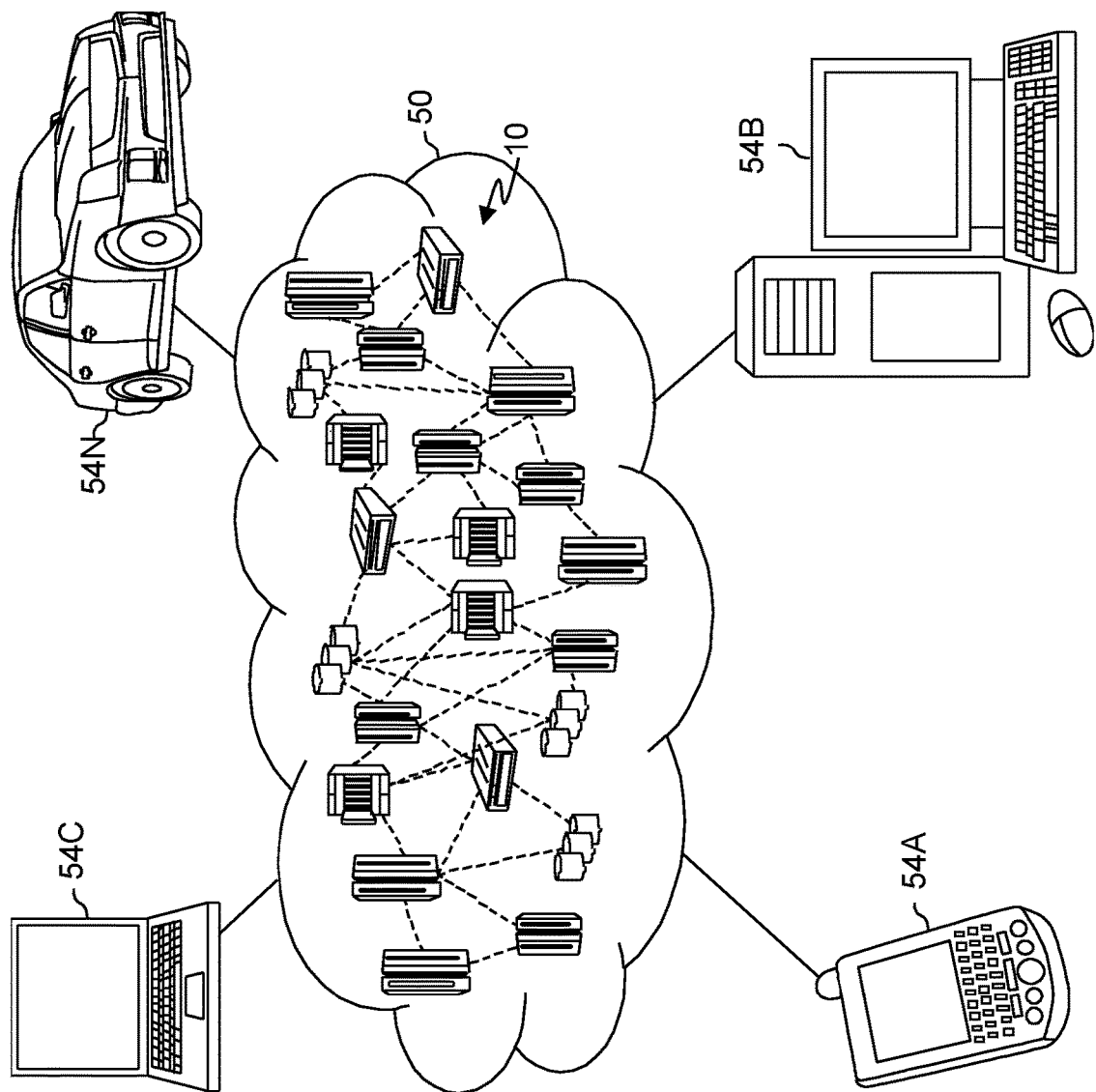
FIG. 6 is a schematic diagram of a cloud computing environment in which inventive concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
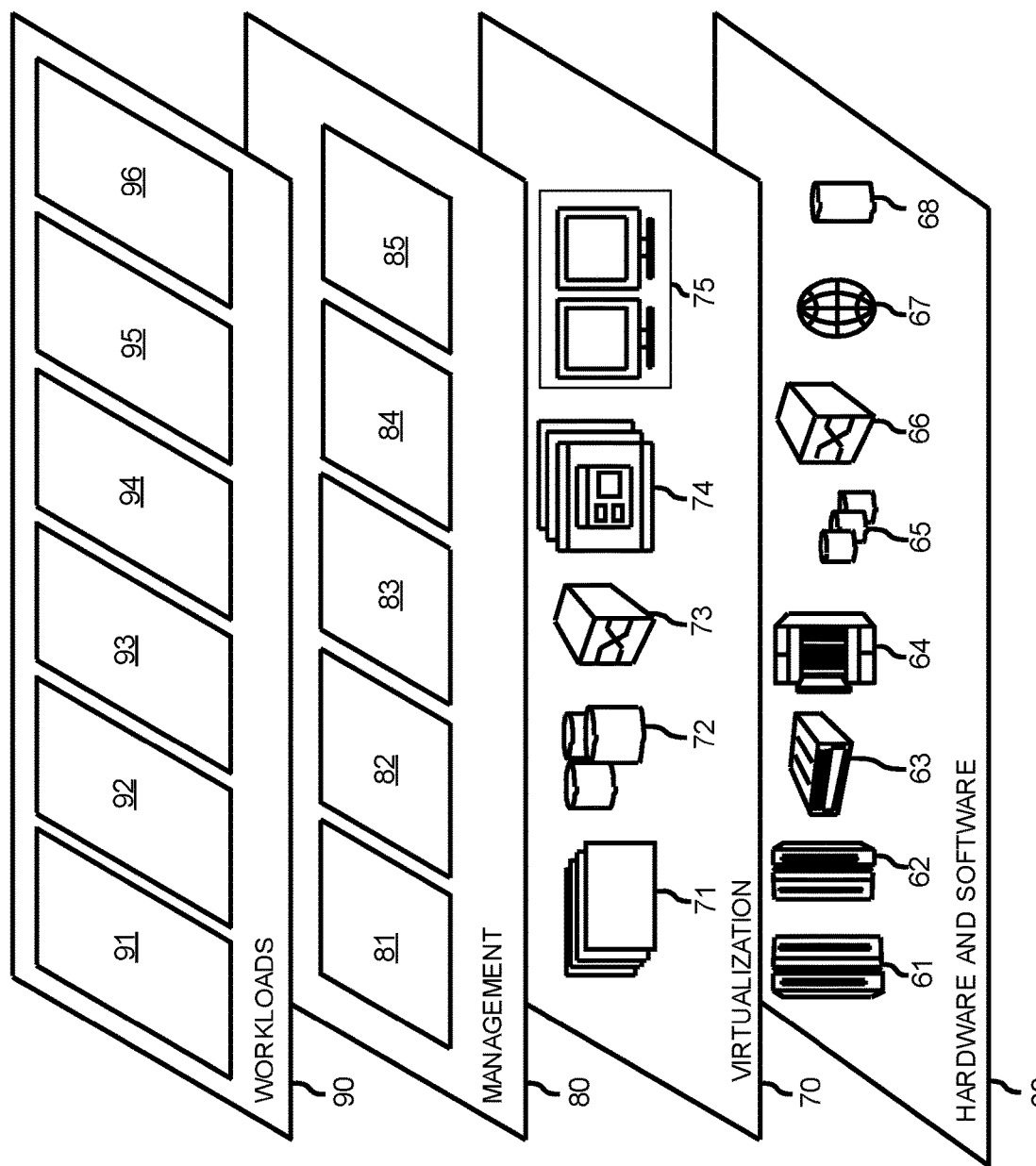
FIG. 7 is a diagram of model layers of a cloud computing environment in which inventive concepts of the present disclosure may be implemented, in accordance with an embodiment of the present disclosure.

Referring now to FIG. 7, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

What is claimed is:

1. A method, comprising:
    monitoring network traffic to a first network resource located within a first region of a set of regions, the network traffic being received from a set of computing devices located within two or more regions within the set of regions, the network traffic containing geographic information for traffic between the first network resource and the set of computing devices indicating one or more geographic regions of computing devices of the set of computing devices;
    based on monitoring the network traffic, determining a second region of the set of regions associated with at least a portion of the network traffic received from a subset of computing devices located within the second region associated with an identified geographic region, for the subset of computing devices, indicated by the geographic information within the network traffic;

generating a resource backup of a container implemented at the first network resource, the resource backup representing a current state of the container at the first network resource, the container being associated with the portion of network traffic of the second region received from the subset of computing devices located within the second region and the identified geographic region for the subset of computing devices;

based on determining the second region, the identified geographic region, and generating the resource backup of the container, transferring the container of the resource backup to a second network resource associated with the second region; and redirecting at least a portion of the network traffic from the subset of computing devices located within the second region to the second network resource.

2. The method of claim 1, wherein the resource backup is generated in real-time.

3. The method of claim 1, wherein transferring the resource backup to the second network resource further comprises:

identifying one or more network resources associated with the second region;

determining an operating capacity of the one or more network resources;

based on the operating capacities, selecting the second network resource from the one or more network resources; and copying the resource backup to the second network resource.

4. The method of claim 1, wherein redirecting the portion of the network traffic further comprises:

transmitting a redirect message from one or more of the first network resource and the second network resource to one or more client devices associated with the network traffic.

5. The method of claim 1, wherein monitoring the network traffic to the first network resource further comprises:

determining the network traffic to the first network resource exceeds a traffic threshold.

6. The method of claim 5, further comprising:

based on redirecting the portion of the network traffic to the second network resource, monitoring network traffic at the first network resource;

determining the network traffic to the first network resource is below the traffic threshold; and redirecting network traffic from the second network resource to the first network resource.

7. The method of claim 6, further comprising:

releasing the second network resource from the resource backup.

8. A system, comprising:

one or more processors; and a non-transitory computer-readable storage medium, coupled to the one or more processors, storing program instructions that, when executed by the one or more processors, cause the one or more processors to perform operations comprising:

monitoring network traffic to a first network resource located within a first region of a set of regions, the network traffic being received from a set of computing devices located within two or more regions within the set of regions, the network traffic containing geographic information for traffic between the first network resource and the set of computing devices indicating one or more geographic regions of computing devices of the set of computing devices;

based on monitoring the network traffic, determining a second region of the set of regions associated with at least a portion of the network traffic received from a subset of computing devices located within the second region associated with an identified geographic region, for the subset of computing devices, indicated by the geographic information within the network traffic;

generating a resource backup of a container implemented at the first network resource, the resource backup representing a current state of the container at the first network resource, the container being associated with the portion of network traffic of the second region received from the subset of computing devices located within the second region and the identified geographic region for the subset of computing devices;

based on determining the second region, the identified geographic region, and generating the resource backup of the container, transferring the container of the resource backup to a second network resource associated with the second region; and redirecting at least a portion of the network traffic from the subset of computing devices located within the second region to the second network resource.

9. The system of claim 8, wherein transferring the resource backup to the second network resource further comprises:

identifying one or more network resources associated with the second region;

determining an operating capacity of the one or more network resources;

based on the operating capacities, selecting the second network resource from the one or more network resources; and copying the resource backup to the second network resource.

10. The system of claim 8, wherein redirecting the portion of the network traffic further comprises:

transmitting a redirect message from one or more of the first network resource and the second network resource to one or more client devices associated with the network traffic.

11. The system of claim 8, wherein monitoring the network traffic to the first network resource further comprises:

determining the network traffic to the first network resource exceeds a traffic threshold.

12. The system of claim 11, wherein the operations further comprise:

based on redirecting the portion of the network traffic to the second network resource, monitoring network traffic at the first network resource;

determining the network traffic to the first network resource is below the traffic threshold; and redirecting network traffic from the second network resource to the first network resource.

13. The system of claim 12, wherein the operations further comprise:

releasing the second network resource from the resource backup.

14. A computer program product comprising a non-transitory computer readable storage medium having program instructions embodied therewith, the program instructions being executable by one or more processors to cause the one or more processors to perform operations comprising:

monitoring network traffic to a first network resource located within a first region of a set of regions, the network traffic being received from a set of computing devices located within two or more regions within the set of regions, the network traffic containing geographic information for traffic between the first network resource and the set of computing devices indicating one or more geographic regions of computing devices of the set of computing devices;

based on monitoring the network traffic, determining a second region of the set of regions associated with at least a portion of the network traffic received from a subset of computing devices located within the second region associated with an identified geographic region, for the subset of computing devices, indicated by the geographic information within the network traffic;

generating a resource backup of a container implemented at the first network resource, the resource backup representing a current state of the container at the first network resource, the container being associated with the portion of network traffic of the second region received from the subset of computing devices located within the second region and the identified geographic region for the subset of computing devices;

based on determining the second region, the identified geographic region, and generating the resource backup of the container, transferring the container of the resource backup to a second network resource associated with the second region; and redirecting at least a portion of the network traffic from the subset of computing devices located within the second region to the second network resource.

15. The computer program product of claim 14, wherein the resource backup is generated in real-time.

16. The computer program product of claim 14, wherein transferring the resource backup to the second network resource further comprises:

identifying one or more network resources associated with the second region;

determining an operating capacity of the one or more network resources;

based on the operating capacities, selecting the second network resource from the one or more network resources; and copying the resource backup to the second network resource.

17. The computer program product of claim 14, wherein redirecting the portion of the network traffic further comprises:

transmitting a redirect message from one or more of the first network resource and the second network resource to one or more client devices associated with the network traffic.

18. The computer program product of claim 14, wherein monitoring the network traffic to the first network resource further comprises:

determining the network traffic to the first network resource exceeds a traffic threshold.

19. The computer program product of claim 18, wherein the operations further comprise:

based on redirecting the portion of the network traffic to the second network resource, monitoring network traffic at the first network resource;

determining the network traffic to the first network resource is below the traffic threshold; and redirecting network traffic from the second network resource to the first network resource.

20. The computer program product of claim 19, wherein the operations further comprise:

releasing the second network resource from the resource backup.

\* \* \* \* \*